(12) United States Patent  
Matsuda et al.

(10) Patent No.: US 7,197,397 B2  
(45) Date of Patent: Mar. 27, 2007

(54) APPARATUS, METHOD, AND COMPUTER PROGRAM FOR EVALUATING ENVIRONMENTAL MEASURES

(75) Inventors: Hiroo Matsuda, Yoshikawa (JP); Sachio Matsuura, Yokohama (JP); Yoshio Itoi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 73 days.

(21) Appl. No.: 11/073,756

(22) Filed: Mar. 8, 2005

(65) Prior Publication Data

US 2005/0209780 A1    Sep. 22, 2005

(30) Foreign Application Priority Data

Mar. 11, 2004    (JP)    ............................. 2004-069328

(51) Int. Cl.
G06F 19/00    (2006.01)
G06Q 50/00    (2006.01)

(52) U.S. Cl. ............................................. 702/2; 705/7
(58) Field of Classification Search .................... 702/2, 702/3, 5

See application file for complete search history.

(56) References Cited

FOREIGN PATENT DOCUMENTS

JP    2003-099520    4/2003

OTHER PUBLICATIONS

ISO 14000 Standards collection on CD-ROM: ISO 14000—Environmental Management, Contents (2 pages), 2001, Version 3, ISBN 92-67-01128-6.*

ISO 14031: Environmental Performance Evaluation, by David Putnam, Sep. 2002, 10 pages.*

Grier, Pete, "Prism eSolutions Adds ISO 14000 EMS Content to equation(TM) Product Line", Adhesives and Sealants Industry, Mar. 2003, vol. 10, Issue 2, p. 20, 1 page.*

* cited by examiner

*Primary Examiner*—Donald McElheny, Jr.
(74) *Attorney, Agent, or Firm*—Morrison & Foerster LLP

(57) ABSTRACT

An evaluation apparatus (environmental measures evaluation apparatus) of an evaluation system (environmental measures evaluation system) obtains data representing environmental measures carried out by users from user terminals via a network. The evaluation apparatus obtains score corresponding to the contents of the environmental measures from a research item DB, then calculates total scores category by category. The evaluation apparatus specifies level of each category based on the calculated total scores and progress level decision data stored in a progress level DB. The evaluation apparatus obtains advisory information corresponding to the specified level from an advisory information DB, and transmits data including the advisory information and specified level to the user terminal via the network.

11 Claims, 21 Drawing Sheets

FIG. 10A

| FIG. 10 | FIG. 10A | FIG. 10B |
|---|---|---|
|  | FIG. 10C | |

RESEARCH SHEET — 500

YOUR NAME ( CUSTOMER NAME ) _____ 505

SEND — 506

| 1. AIR CONDITIONING ( AC ) | | |
|---|---|---|
| 1-1 | DO YOU HAVE A ENERGY SAVING ORIENTED GUIDELINE FOR INTRO... | ○ YES ○ NO |
| 1-2 | DO YOU HAVE MEASURES FOR IMPROVING THERMAL EFFICIENCY? | ○ YES ○ NO |
| 1-3 | DO YOU HAVE A GUIDELINE FOR AC EQUIPMENT OPERATION BEING OB... | ○ YES ○ NO |
| 1-4 | DO YOU HAVE A TARGET VALUE FOR ENERGY SAVING APPROVED BY Y... | ○ YES ○ NO |
| 1-5 | DO YOU HAVE A GUIDELINE FOR HUMAN ACTIVITIES FOR ENERGY SAVING ... | ○ YES ○ NO |
| 1-6 | DO YOU ACHIEVE YOUR GOALS? | |

| 2. LIGHTING ( LT ) | | |
|---|---|---|
| 2-1 | DO YOU HAVE A ENERGY SAVING ORIENTED GUIDELINE FOR INTRO... | ○ YES ○ NO |
| 2-2 | DO YOU HAVE A GUIDELINE FOR LIGHTING OPERATION BEING OBEYED ... | ○ YES ○ NO |
| 2-3 | DO YOU HAVE A TARGET VALUE FOR ENERGY SAVING APPROVED BY Y... | ○ YES ○ NO |
| 2-4 | DO YOU HAVE A GUIDELINE FOR HUMAN ACTIVITIES FOR ENERGY SAVING ... | ○ YES ○ NO |
| 2-5 | DO YOU ACHIEVE YOUR GOALS? | ○ YES ○ NO |

FIG. 10B

| | | | YES | ○ | NO |
|---|---|---|---|---|---|
| 3. OFFICE AUTOMATION EQUIPMENT (OA) | | | | | |
| 3-1 | DO YOU HAVE A ENERGY SAVING ORIENTED GUIDELINE FOR INTRO... | ○ | YES | ○ | NO |
| 3-2 | DO YOU HAVE A GUIDELINE FOR MANAGING ENERGY OF OA EQUIPMENT | ○ | YES | ○ | NO |
| 3-3 | DO YOU HAVE A TARGET VALUE FOR ENERGY SAVING APPROVED BY Y... | ○ | YES | ○ | NO |
| 3-4 | DO YOU ACHIEVE YOUR GOALS? | ○ | YES | ○ | NO |
| 3-5 | DO YOU ACT BEHAVIOR FOR REDUCING ENVIRONMENTAL IMPACT ... | ○ | YES | ○ | NO |
| 3-6 | DO YOU HAVE A GUIDELINE FOR BUYING RECYCLED PRODUCTS (PAPER... | ○ | YES | ○ | NO |
| 4. GREEN PROCUREMENT (GP) -STATIONERY/OFFICE SUPPLY- | | | | | |
| 4-1 | DO YOU HAVE A TARGET VALUE FOR MINIMUM PURCHASE OF STATIONA... | ○ | YES | ○ | NO |
| 4-2 | DO YOU HAVE A TARGET VALUE FOR GREEN PROCUREMENT OF STATION... | ○ | YES | ○ | NO |
| 4-3 | DO YOU HAVE A GUIDELINE FOR IMPROVING EFFICIENCY WHILE USING ... | ○ | YES | ○ | NO |
| 4-4 | DO YOU ACHIEVE YOUR GOALS FOR MINIMUM PURCHASE? | ○ | YES | ○ | NO |
| 4-5 | DO YOU ACHIEVE YOUR TARGET VALUES FOR GREEN PROCUREMENT? | ○ | YES | ○ | NO |
| 5. WATER USAGE (WU) | | | | | |
| 5-1 | DO YOU HAVE A FACILITY FOR SAVING WATER USAGE | ○ | YES | ○ | NO |
| 5-2 | DO YOU HAVE EDUCATIONAL PROGRAMS FOR SAVING WATER USAGE | ○ | YES | ○ | NO |
| 5-3 | DO YOU HAVE GOALS FOR SAVING WATER USAGE | ○ | YES | ○ | NO |
| 5-4 | DO YOU ACHIEVE YOUR GOALS FOR SAVING WATER? | ○ | YES | ○ | NO |

FIG. 10C

| | | | YES | ○ | NO |
|---|---|---|---|---|---|
| 6. FUEL CONSUMPTION (FC) -GASOLINE- | | | | | |
| 6-1 | DO YOU PROMOTE TO PURCHASE ENERGY SAVING ORIENTED VEHICLE ? | ○ | YES | ○ | NO |
| 6-2 | DO YOU MAKE EFFORT TO REDUCE VEHICLE ? | ○ | YES | ○ | NO |
| 6-3 | DO YOU HAVE A TARGET VALUE FOR REDUCING GASOLINE CONSUMPTION ? | ○ | YES | ○ | NO |
| 6-4 | DO YOU HAVE A GUIDELINE FOR USING VEHICLES WITH LESS ENERGY ... | ○ | YES | ○ | NO |
| 6-5 | DO YOU HAVE A GUIDELINE FOR DRIVING VEHICLES WITH LESS ENERGY ... | ○ | YES | ○ | NO |
| 6-6 | DO YOU ACHIEVE YOUR GOALS FOR SAVING GASOLINE ? | ○ | YES | ○ | NO |
| 7. ZERO WASTE (ZW) | | | | | |
| 7-1 | DO YOU PROMOTE COMPLETE SEPARATION OF WASTES ? | ○ | YES | ○ | NO |
| 7-2 | DO YOU HAVE A GUIDELINE FOR LESS WASTES BEING OBEYED ... | ○ | YES | ○ | NO |
| 7-3 | DO YOU HAVE A SYSTEM FOR RECYCLING THERMAL WASTES EXCEPT TH... | ○ | YES | ○ | NO |
| 7-4 | DO YOU ACHIEVE ZERO WASTE POLICY ? | ○ | YES | ○ | NO |
| 7-5 | DO YOU HAVE A SYSTEM FOR RECYCLING FOOD WASTES ? | ○ | YES | ○ | NO |
| 7-6 | DO YOU MAKE EFFORT TO REDUCE FOOD WASTES ? | ○ | YES | ○ | NO |

FIG. 11A

| FIG. 11A | FIG. 11B |
|---|---|
| FIG. 11C | FIG. 11D |

FIG. 11

PROGRESS INDICATOR

600

ISSUED BY:

3. DETAILED ADVISORY INFORMATION

RESEARCH ITEM | A | RS | SC | LEVEL — 631 | OUR ADVICE

1. AIR CONDITIONING (AC)

| | | A | RS | SC | L | PT |
|---|---|---|---|---|---|---|
| 1-1 | ********** | ○ | 6 | 6 | 0 | 0 |
| | ********** | | | | 1 | 1-9 |
| 1-2 | ********* | × | 3 | | 2 | 10-14 |
| 1-3 | ******** | × | 7 | | 3 | 15-19 |
| 1-4 | ******** | ○ | 4 | 4 | 4 | 20-24 |
| 1-5 | ****** | ○ | 4 | 4 | 5 | 25-30 |
| 1-6 | ***** | × | 6 | | L | 2 |
| | | ST | 30 | 14 | | |

610

CUSTOMER: AA

1. EVALUATION RESULT

| | ESI | | | RSI | | | |
|---|---|---|---|---|---|---|---|
| | AC | LT | OA | GP | WU | FC | ZW |
| SCORE | 14 | 6 | 14 | 34 | 2 | 4 | 4 | 6 | 16 |
| LEVEL | 2 | 2 | 2 | — | 2 | 4 | 4 | 3 | — |

4. GREEN PROCUREMENT (GP)

| | | | * | ** |
|---|---|---|---|---|
| 4-1 | ********** | × | 1 | |
| | | | * | 0 | 0 |
| 4-2 | ********** | ○ | 2 | 2 | 1 | 1 |
| | | | | 2 | 2 |
| 4-3 | ********** | × | 1 | 3 | 3 |
| 4-4 | ********** | × | 0.5 | 4 | 4 |
| 4-5 | ********** | × | 0.5 | 5 | 5 |
| | | * | 5 2 | * | 2 |

5. WATER USAGE (WU)

| | | | * | ** |
|---|---|---|---|---|
| 5-1 | ********** | ○ | 2 2 | 0 | 0 |
| 5-2 | ********** | ○ | 1 1 | 1 | 1 |
| | | | | 2 | 2 |
| 5-3 | ********** | ○ | 1 1 | 3 | 3 |
| | | | | 4 | 4 |
| 5-4 | ********** | × | 1 | 5 | 5 |
| | | * | 5 4 | * | 4 |

---

BRIEF REPORT

GENERAL COMMENTS
**************************************
**************************************

AIR CONDITIONING (AC)
**************************************
**************************************

LIGHTING (LT)
**************************************
**************************************

OFFICE AUTOMATION EQUIPMENT (OA)
**************************************

GREEN PROCUREMENT (GP)
**************************************
**************************************

AIR CONDITIONING ( AC )
ACCORDING TO THE GOVERNMENTAL GUIDELINE, 28°C IS RECOMMENDED TEMPERATURE SETTING OF AIR CONDITIONER DURING THE SUMMER. IF YOU SHIFT TEMPERATURE SETTING +1°C, 5% OF ELECTRIC ENERGY CONSUMPTION WILL BE REDUCED. IF YOU REPLACE THE AIR CONDITIONING EQUIPMENT TO ENERGY SAVING ORIENTED MODEL, 40% OF ELECTRIC ENERGY CONSUMPTION WILL BE REDUCED. ...

LIGHTING ( LT )
SENSOR RELATED AUTOMATIC LIGHTING CONTROL IS HELPFUL FOR ENERGY SAVING, ESPECIALLY FOR RESTROOMS ETC. MORE ENERGY SAVING MAY BE ACHIEVED IF YOU PROMOTE EDUCATION TO TURN OFF THE ROOM LIGHTS DURING LUNCH BREAK ETC. ...

OFFICE AUTOMATION EQUIPMENT ( OA )
INTRODUCING PRINT MANAGING SYSTEM WILL BRING REDUCTION OR ENVIRONMENTAL IMPACT. MANAGEMENT RULES FOR PRINTERS OR COPIERS MAY BE REQUIRED. THE LATEST COPYING MACHINE MAY ACHIEVE 70% OF POWER SAVING DURING STANDBY MODE. ...

GREEN PROCUREMENT ( GP )
-STATIONERY, OFFICE SUPPLIES -
ON-LINE PURCHASING SYSTEM HAVING RESTRICTION TO ELIMINATE NON-GREEN PROCUREMENT ITEMS IS EFFECTIVE FOR EXPANDING GREEN PROCUREMENT.

WATER USAGE ( WU )
IT IS SHOWN BY FORMER CASES THAT INTRODUCING IMITATIVE SOUND MACHINES TO LADIES' ROOMS IS EFFECTIVE FOR REDUCING EXTRA WATER USAGE. ...

FUEL CONSUMPTION ( FC )
YOUR GUIDELINE FOR VEHICLE MANAGEMENT MAY BE REVIEWED. ...

ZERO WASTE ( ZW )
EDUCATION PROGRAMS OR PATROL MAY BE EFFECTIVE FOR LESS WASTES.

FIG. 14A

3. DETAILED ADVISORY INFORMATION

| | RESEARCH ITEMS | ANS. | REF. SCORE | YOUR SCORE | PROGRESS LEVEL | OUR ADVICE |
|---|---|---|---|---|---|---|
| 1. AIR CONDITIONING (AC) | | | | | | |
| 1-1 | DO YOU HAVE A ENERGY SAVING ORIENTED GUIDELINE FOR INTRODUCING AC EQUIPMENT? | ○ | 6 | 6 | | INFORMATION OF ENERGY SAVING ORIENTED MODELS, CONSULTATION SERVICE,... |
| 1-2 | DO YOU HAVE MEASURES FOR IMPROVING THERMAL EFFICIENCY? | × | 3 | | | LATEST TRENDS OF THERMAL EFFICIENCY IMPROVEMENT,... |
| 1-3 | DO YOU HAVE A GUIDELINE FOR AC EQUIPMENT OPERATION BEING OBEYED ... | × | 7 | | | SAMPLE CASES OF MANAGEMENT RULE... |
| 1-4 | DO YOU HAVE A TARGET VALUE FOR ENERGY SAVING APPROVED BY YOUR STAKEHOLDER? | ○ | 4 | 4 | | HOW TO ARRANGE TARGET VALUE BASED ON DEFACT STANDARD AND KYOTO ... |
| 1-5 | DO YOU HAVE A GUIDELINE FOR HUMAN ACTIVITIES FOR ENERGY SAVING (WORK TIME REGULATION...) | ○ | 4 | 4 | | SAMPLE CASES OF ENERGY SAVING RULES DONE BY OUR CUSTOMERS |
| 1-6 | DO YOU ACHIEVE YOUR GOALS? | × | 6 | | | HELPFUL KNOW-HOW AND PRODUCTS FOR ACHIEVEMENT... |
| | SUB TOTAL | | 30 | 14 | | |

| PROG. SCORE LEVEL | RANGE |
|---|---|
| 0 | 0 |
| 1 | 1~9 |
| 2 | 10~14 |
| 3 | 15~19 |
| 4 | 20~24 |
| 5 | 25~30 |
| RESULT LEVEL | 2 |

631

| FIG. 14A |
|---|
| FIG. 14B |

FIG. 14

APPARATUS, METHOD, AND COMPUTER PROGRAM FOR EVALUATING ENVIRONMENTAL MEASURES

BACKGROUND OF THE INVENTION

1. Field of the Invention

The present invention relates to an apparatus, a method, and a computer program for evaluating environmental measures for reducing the environmental impact to provide advisory information for more effective environmental measures.

2. Description of the Related Art

In view of environmental conservation, actions for reducing environmental impact have been introduced to activities of many business entities. For example, they should select low environment-oriented goods to be used in the business entities. Unexamined Japanese Patent Application KOKAI Publication No. 2003-99520 discloses a technique for supporting such the activities for reducing environmental impact. This proposes a system in which a server determines score (points) based on at least one of sales amount of products, amount of usage, and amount of collected used products. The server stores score data, and provides users with services in accordance with the score. Since it provides the users with services in accordance with the users' level of environmental impact reduction, it is effective for promoting their actions for reducing the environmental impacts.

Though various factors affect the environmental impacts, such the system merely focuses some factors. Even if actions for some factors are carried out, it is not enough for other factors. Such the imperfection is a negative element for carrying out effective environmental management in business entities.

On the other hand, the persons in action should be aware of details of the action to reduce the environmental impacts. For example, if the user have already carried out actions or countermeasures for environmental conservation, it is important to inform them of effective actions for reducing the environmental impacts corresponding to the users' level or the like.

The present invention has been made as a solution for the above problems, and it is an object of the present invention to present an apparatus, a method, and a computer program product for providing proposal information to promote more effective environmental impact reduction.

SUMMARY OF THE INVENTION

To achieve the above objects, an evaluation apparatus according to a first aspect of the present invention is an evaluation apparatus for evaluating environmental measures being connected to a terminal via a network, which comprises:

a level data storage which stores data representing level corresponding to environmental measures;

an advisory data storage which stores advisory information for improving the level;

an information retriever which obtains information representing environmental measures carried out by a user from the terminal of the user via the network;

an evaluation unit which specifies level of the user based on the information obtained by the information retriever and the data stored in the level data storage; and an advisory information transmitter which obtains the advisory information from the advisory data storage based on the level specified by the evaluation unit, and transmits evaluation result data including the obtained advisory information to the terminal via the network.

The level data storage of the evaluation apparatus may further comprise:

a score data storage which stores score data representing scores assigned to each environmental measures; and a decision data storage which stores decision data for deciding the level corresponding to the score, and the evaluation unit obtains score data corresponding to the data obtained from the terminal from the score data storage, and specifies level of the user by obtaining the decision data corresponding to the obtained score from the decision data storage.

The level data storage of the evaluation apparatus may store information representing environmental measures with predetermined categorization, the evaluation unit may specify level of the user in accordance with the categorization, and the advisory information transmitter may transmit the evaluation result data so as to present indication for comparing the level specified by the evaluation unit in accordance with the categorization.

The evaluation apparatus may further comprise a precedent data storage which stores precedent information regarding each of the environmental measures, the evaluation unit may obtain precedent information corresponding to the evaluation result from the precedent data storage, and the advisory information transmitter may transmit the evaluation result data so as to present the precedent information obtained by the evaluation unit.

To achieve the above objects, an evaluation apparatus according to a second aspect of the present invention is an evaluation apparatus being connected to a terminal via a network for evaluating environmental measures, which comprises:

level data storage means for storing level data regarding levels corresponding to environmental measures including environmental measures data representing categorized environmental measures, score data representing scores assigned to the environmental measures respectively, and decision data for deciding the level corresponding to the score;

precedent data storage means for storing precedent information corresponding to each of the environmental measures;

advisory data storage means for storing advisory data for improving the level;

information retrieving means for obtaining information representing environmental measures carried out by a user from a terminal of the user via the network;

evaluation means for evaluating level of the user based on the information obtained by the information retriever and the data stored in the level data storage means; and advisory data transmission means for obtaining advisory information from the advisory data storage means and precedent information from the precedent data storage means based on the level specified by the evaluation means, and transmits evaluation result data including the obtained advisory information and precedent information to be graphically displayed, to the terminal via the network.

To achieve the above objects, a method according to a third aspect of the present invention is a method for evaluating environmental measures with using a computer, which comprises the steps of:

recording level data regarding levels corresponding to environmental measures;

recording advisory information for improving the levels;

obtaining information representing environmental measures carried out by a user from a terminal of the user via a network;

specifying level of the user based on the information obtained from the terminal and the level data; and obtaining advisory information corresponding to the specified level, and transmitting evaluation result data including the obtained advisory information to the terminal via the network.

The method may further comprise the steps of:

recording score data representing scores assigned to the environmental measures respectively;

recording decision data for deciding levels corresponding to scores;

obtaining scored data corresponding to the data obtained from the terminal; and specifying the level of the user by obtaining the decision data corresponding to the obtained score.

The method may further comprise the steps of:

recording score data representing scores each arranged for the environmental measures respectively based on the amount of carbon dioxide decrease resulting from carrying out the environmental measures;

recording decision data for deciding the levels corresponding to score;

obtaining score data corresponding to the data obtained from the terminal; and specifying level of the user by obtaining decision data corresponding to the obtained score.

The method may further comprise the steps of:

storing data representing environmental measures with predetermined categorization;

storing data regarding level corresponding to the environmental measures;

specifying level of the user category by category; and transmitting the evaluation result data including data for graphically displaying the specified levels for comparison, to the terminal via the network.

The method may further comprise the steps of:

storing data representing precedent information corresponding to each of the environmental measures; and obtaining said precedent information, and transmitting said obtained precedent information together with said evaluation result data.

To achieve the above objects, a computer program product according to a fourth aspect of the present invention is a computer program product for causing a computer to execute a method for evaluating environmental measures, which comprises the steps of:

recording level data regarding levels corresponding to environmental measures;

recording advisory information for improving the levels;

obtaining information representing environmental measures carried out by a user from a terminal of the user via a network;

specifying level of the user based on the information obtained from the terminal and the level data; and obtaining advisory information corresponding to the specified level, and transmitting evaluation result data including the obtained advisory information to the terminal via the network.

To achieve the above objects, a computer data signal according to a fifth aspect of the present invention is a computer data signal embodied in a carrier wave for causing a computer to execute a method for evaluating environmental measures, which comprises the steps of:

recording level data regarding levels corresponding to environmental measures;

recording advisory information for improving the levels;

obtaining information representing environmental measures carried out by a user from a terminal of the user via a network;

specifying level of the user based on the information obtained from the terminal and the level data; and obtaining advisory information corresponding to the specified level, and transmitting evaluation result data including the obtained advisory information to the terminal via the network.

BRIEF DESCRIPTION OF THE DRAWINGS

These objects and other objects and advantages of the present invention will become more apparent upon reading of the following detailed description and the accompanying drawings in which:

FIG. 10 is a diagram exemplifying a "Research Sheet" image displayed through the Evaluation Process shown in FIG. 9;

DETAILED DESCRIPTION OF THE PREFERRED EMBODIMENTS

Preferred embodiments of the present invention will now be described with reference to the accompanying drawings.

Figure 1:
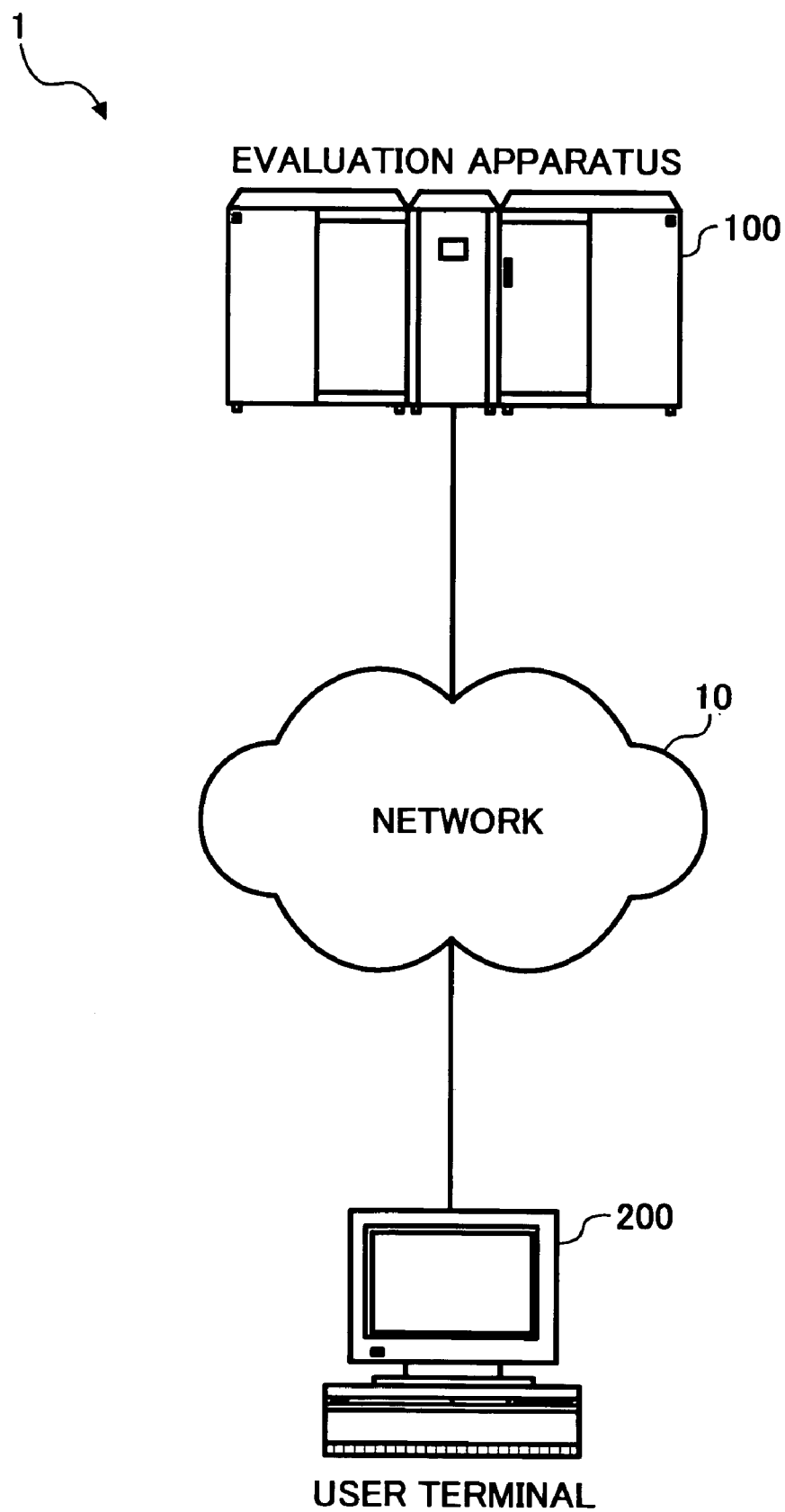
FIG. 1 is a schematic view showing the structure of an environmental activity evaluating system according to the embodiments of the present invention.

FIG. 1 is a schematic diagram showing the structure of an environmental measures evaluation system (hereinafter, referred to as "evaluation system") according to the embodiments of the present invention.

As shown in FIG. 1, the evaluation system 1 comprises an environmental measures evaluation apparatus 100 (hereinafter, referred to as "evaluation apparatus 100") and a user terminal(s) 200 being connected to each other via a network 10.

The network 10 may comprise, for example, the Internet or the like for data communications based on a predetermined telecommunications protocol such as TCP/IP (Transmission Control Protocol/Internet Protocol).

The evaluation apparatus 100 may comprise, for example, a mainframe computer, a workstation computer, or the like. The evaluation apparatus 100 evaluates environmental measures (environmental actions) carried out by business entities such as enterprise based on information obtained from the user terminal 200 being connected to the evaluation apparatus 100 via the network 10, and issues advisory information according to the evaluation results.

In this embodiment, the Internet acts as the network 10, and the evaluation apparatus 100 presents service for evaluating environmental measures with using the Internet. Accordingly, the evaluation apparatus 100 is handled by a business entity which provides such the service, and evaluates environmental measures (that is, environmental conservation activities) carried out by customers (users), for example, business entities such as enterprises, and issues advisory information such as plan, measure, or precedent sample cases helpful for improving their environmental measures.

In this embodiment, environmental measures carried out by customers (users) are previously categorized to 7 categories, for example, "air conditioning (AC)", "lighting (LT)", "office automation equipment (OA)", "Green Procurement (GP)", "water usage (WU)", "fuel (gasoline) consumption (FC)", and "Zero Waste (ZW)". In this embodiment, "environmental measures" mean, for example, measures or plans for reducing the environmental impacts caused by business activities of the users (environmental conservation activities). More precisely, means or plans for less energy consumption, less material usage, less emissions, or less wastes.

Figure 2:
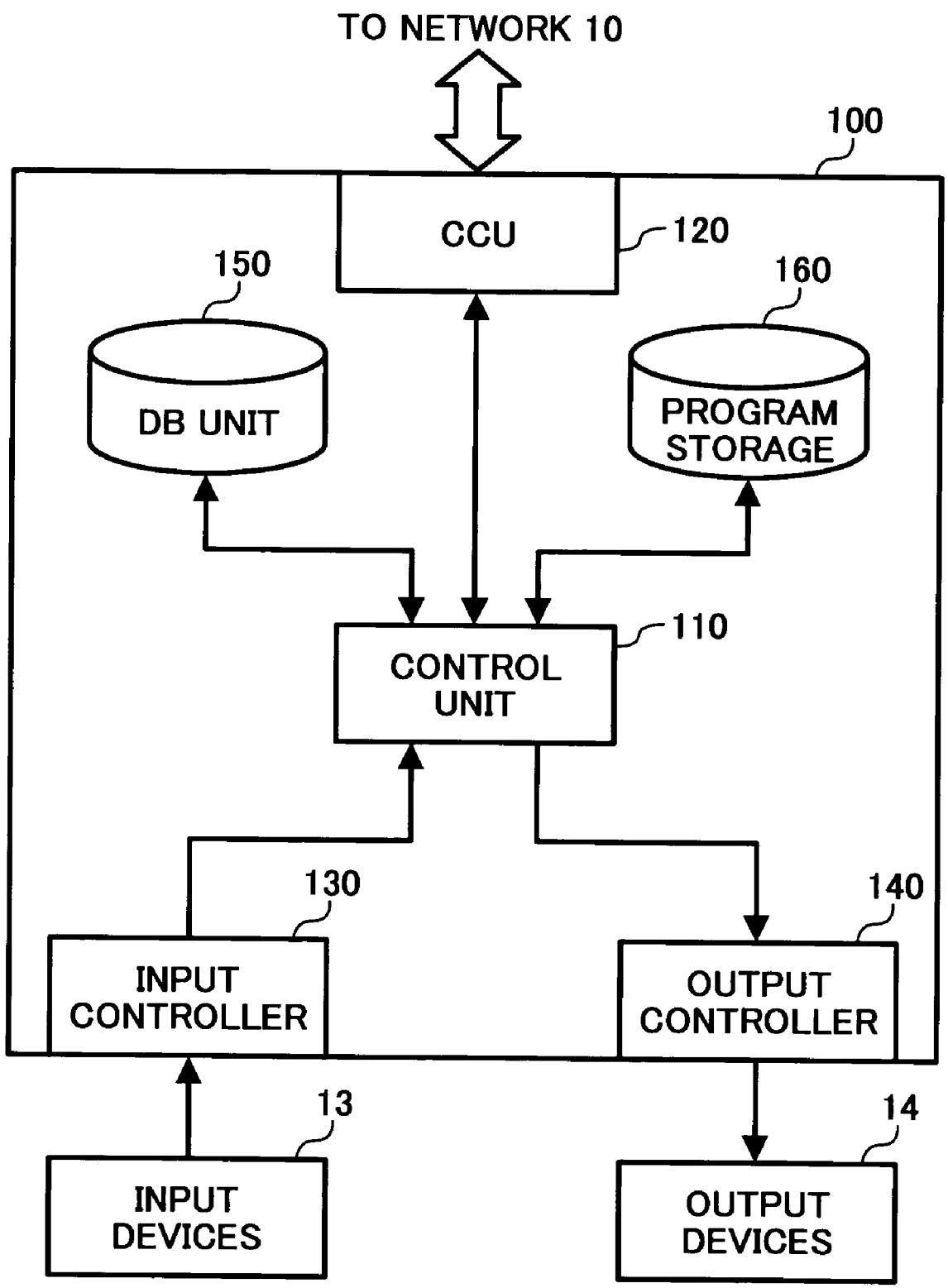
FIG. 2 is a block diagram showing the structure of an environmental activity evaluating apparatus shown in FIG. 1.

The structure of the evaluation apparatus 100 will now be described with reference to FIG. 2. FIG. 2 is a block diagram showing the structure of the evaluation apparatus 100. As shown in FIG. 2, the evaluation apparatus 100 comprises a control unit 110, a communications control unit (CCU) 120, an input controller 130, an output controller 140, a database (DB) unit 150, and a program data storage 160.

The control unit 110 may comprise, for example, a CPU (Central Processing Unit), predetermined memory devices such as RAM (Random Access Memory) which provides work area of the CPU, and the like. The control unit 110 controls each components in the evaluation apparatus 100, and performs processing (described later) according to this invention with executing computer programs stored in the program data storage 160.

The CCU 120 may comprise, for example, predetermined telecommunications devices such as a NIC (Network Interface Card) and a router. The CCU 120 interconnects the evaluation apparatus 100 and the network 10, and performs telecommunications with the user terminal 200.

The input controller 130 accepts predetermined input devices 13 such as a keyboard and a pointing device for generating input signals representing user demand, and transfers the input signals from the input devices 13 to the control unit 110.

The output controller 140 accepts predetermined output devices such as a display and a printer, and outputs predetermined output signals representing, for example, processing results of the control unit 110 or the like, to the output devices 14.

Figure 3:
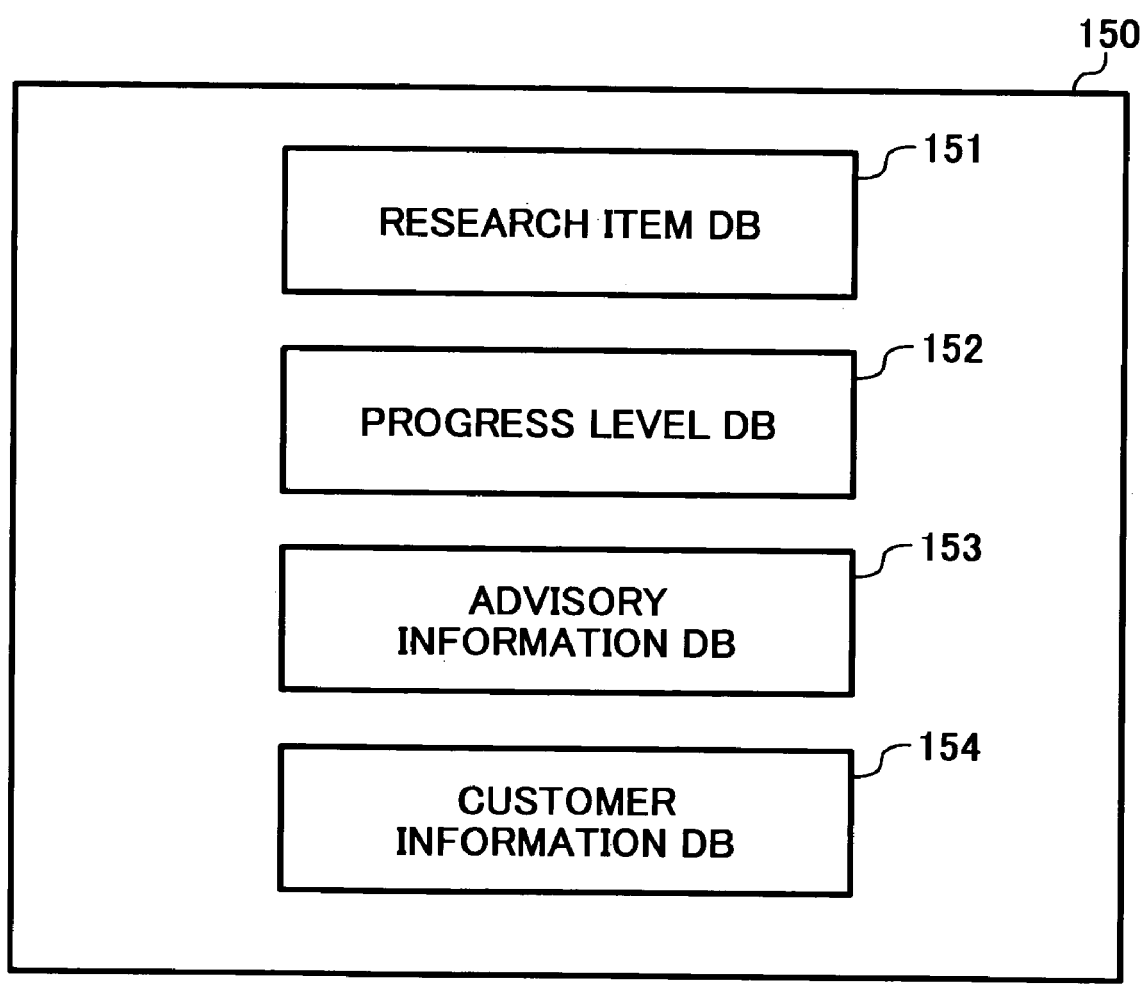
FIG. 3 is a diagram exemplifying the structure of databases in a DB unit shown in FIG. 1.

The DB unit 150 may comprise, for example, a predetermined storage device such as a hard disk drive (HDD), and stores various information necessary for evaluating environmental measures. As shown in FIG. 3, the DB unit 150 comprises a research item DB 151, a progress level DB 152, an advisory information DB 153, a customer information DB 154, and the like. Details of each database will now be described with reference to the drawings.

Figure 4:
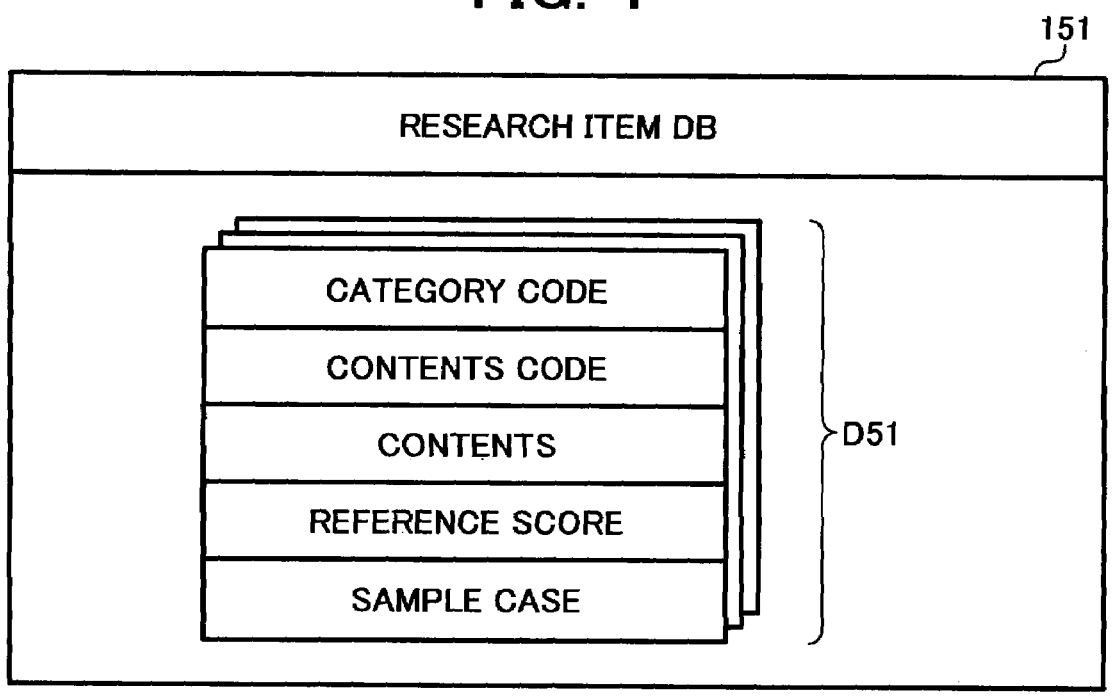
FIG. 4 is a diagram exemplifying data recorded in a research item DB shown in FIG. 3.

FIG. 4 is a diagram exemplifying data stored in the research item DB 151. As shown in FIG. 4, the research item DB 151 stores research item data D51 for evaluating the user's environmental management. The research item data D51 includes data areas corresponding to items "category code", "contents code", "contents", "reference score", and "sample case", and each of the data areas stores data corresponding to the item.

Category code data for specifying the category of the environmental measures are stored in the category code area. In this embodiment, since the environmental measures are categorized to 7 categories, one of numerical codes "1" to "7" is stored as the category code. Each of the numerical code represents the categories. In this embodiment, code "1" represents "air conditioning", code "2" represents "lighting", code "3" represents "office automation equipment", code "4" represents "Green Procurement", code "5" represents "water usage", code "6" represents "fuel consumption", and code "7" represents "zero waste".

Contents code data for specifying the contents in the same category are stored in the contents code area. Accordingly, details of the research will be specified by referring to the category code and the contents code.

Data representing the contents of the research are stored in the contents area. The research contents include questions to be presented to the users for researching the present status of the environmental measures. For example, text data representing "Do you achieve demands in a guideline for introduction of air conditioning equipment, especially concerning energy consumption?", and the like are prepared.

Data representing reference score assigned to this contents are stored in the reference score area. "Reference score" means score (points) which will be given to the user if the activity corresponding to the contents is carried out by the user. And the reference score will be used for evaluating the environmental measures of the user. In this embodiment, the reference score may be arranged based on the expectable decrease of carbon dioxide ($CO_2$) reduced by the action indicated in the research contents. Full score may be 100 pt which will be given if all actions indicated in the research contents are carried out.

Data representing sample cases corresponding to the research contents are stored in the sample case area. "Sample case" means precedential activities which were actually carried out to reduce the environmental impact. For example, if the research item is "Is your guideline for air conditioning in effect?", data representing sample of the "guideline for air conditioning" as a precedent are stored. The sample case data correspond to data regarding advisory information.

Figure 5:
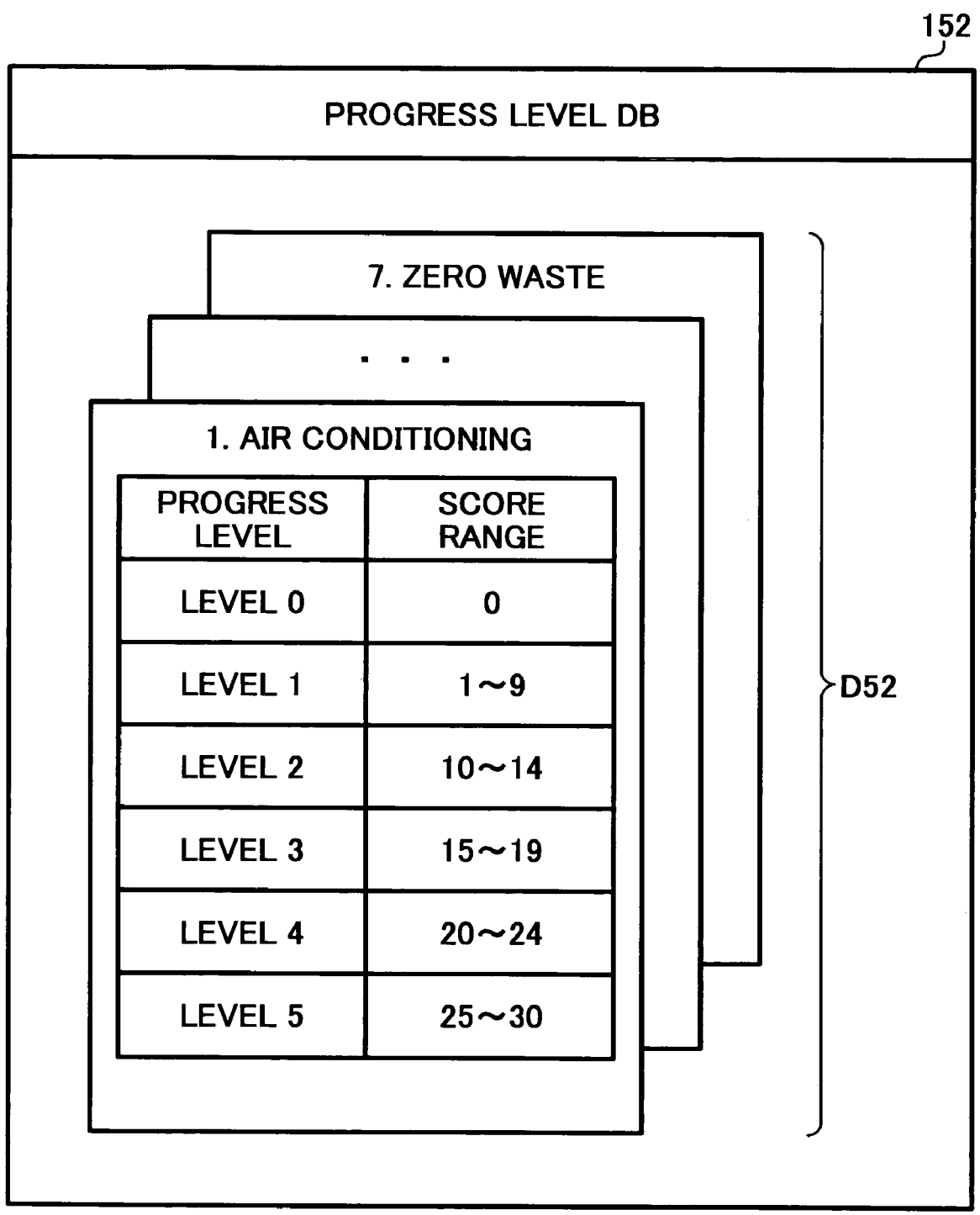
FIG. 5 is a diagram exemplifying data recorded in a progress level DB shown in FIG. 3.

FIG. 5 is a diagram exemplifying data stored in the progress level DB 152. As shown in FIG. 5, the progress level DB 152 stores progress level tables D52 category by category. The progress level table D52 includes information representing the progress level and user score being associated with each other. According to the progress level table D52, level of the customer (user) will be available based on the score of the user. In other words, the level will be decided by referring to the progress level table D52 (decision data).

In this embodiment, for example, 6-grade leveling ("level 0" to "level 5") is given to each category. The balance between the progress level and the user score is arranged category by category. For example, in the "air conditioning" category, "level 1" corresponds to the range of the user score 1–9 pt. In the same manner, "level 2" corresponds to 10–14 pt, "level 3" corresponds to 15–19 pt, "level 4" corresponds to 20–24 pt, and "level 5" corresponds to 25–30 pt. If the user score is 0 pt, "level 0" is assigned to that item in every category.

Figure 6:
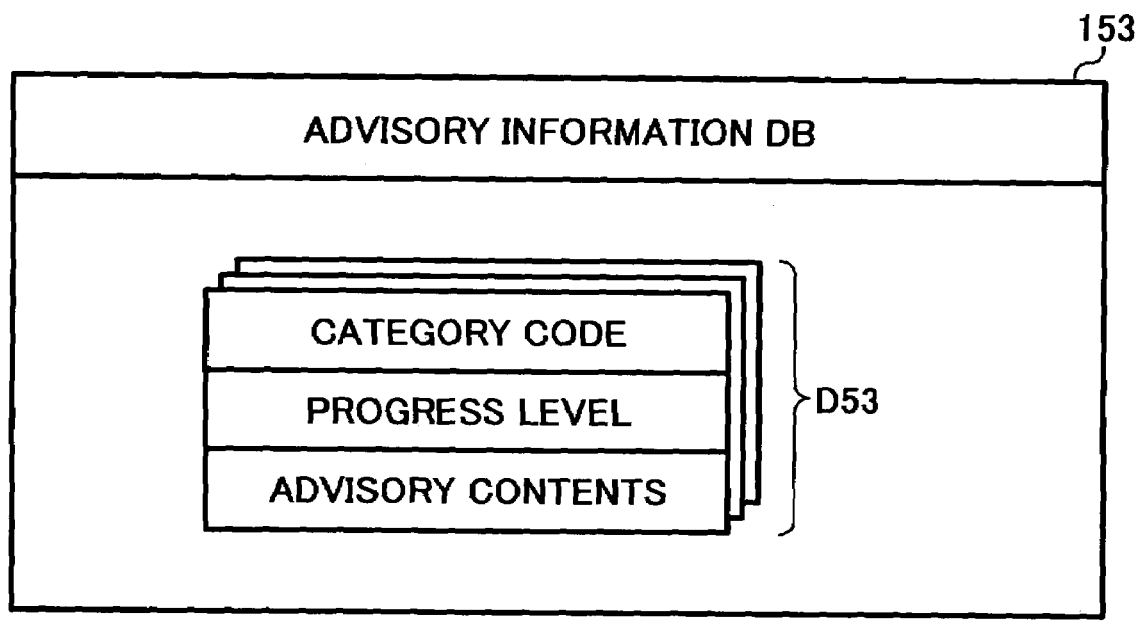
FIG. 6 is a diagram exemplifying data recorded in an advisory information DB shown in FIG. 3.

FIG. 6 is a diagram exemplifying data stored in the advisory information DB 153. As shown in FIG. 6, advisory data D53 representing advices or proposals corresponding to the progress level are stored in the advisory information DB 153. The advisory data D53 include data areas for "category code", "progress level", and "advisory contents", and data are stored in those areas.

Data representing code for specifying categories of the advisory information are stored in the category code area.

Data representing progress level which will be referred when presenting the advisory information are stored in the progress level area.

Data representing advices or proposals for improving the user's level are stored in the advisory contents area. The advisory information is associated with the progress level. In case of the "air conditioning" category, for example, advisory information regarding "less energy equipment" is associated with level 0, or advisory information regarding "advanced sample case for thermal efficiency improvement" is associated with level 1.

Figure 7:
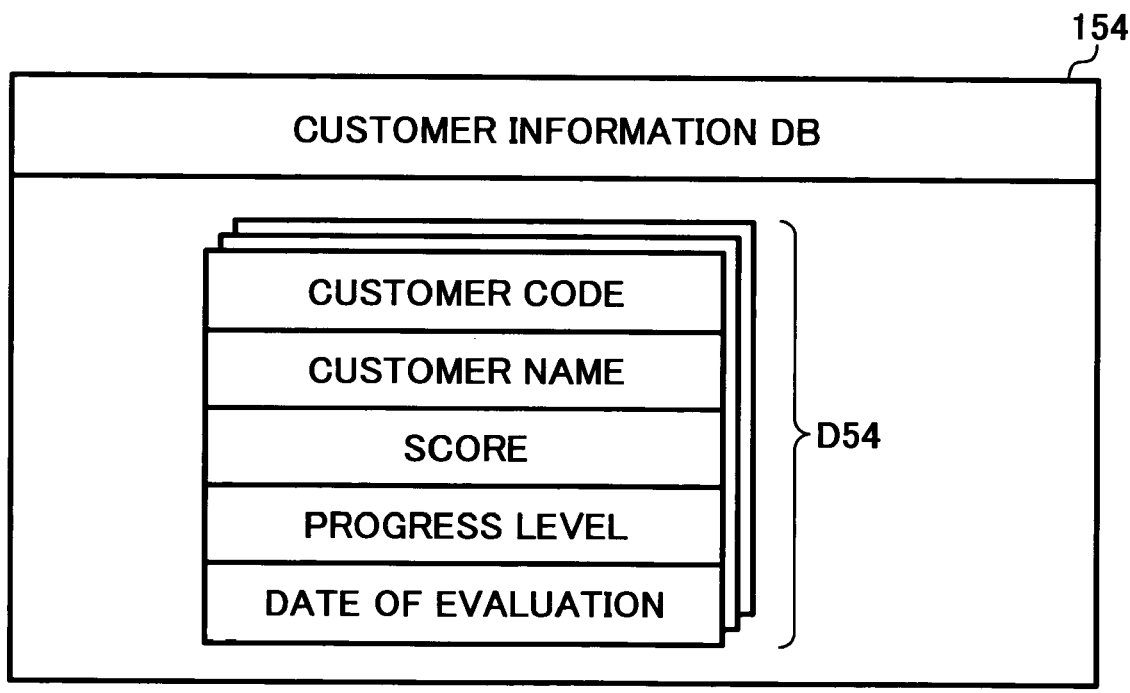
FIG. 7 is a diagram exemplifying data recorded in a customer information DB shown in FIG. 3.

FIG. 7 is a diagram exemplifying data stored in the customer information DB 154. As shown in FIG. 7, the customer information DB 154 stores customer data D54 prepared customer by customer. The customer data D54 include data areas for "customer code", "customer name", "score", "progress level", and "date of evaluation".

Data representing a customer code for specifying the customer are stored in the customer code area.

Data representing name of the customer concerned are stored in the customer name area.

Data representing the score of the customer concerned are stored in the score area.

Data representing the progress level of the customer concerned are stored in the progress level area.

Data representing date when the score and the progress level of the customer concerned are calculated and recorded on the customer information DB 154 are stored in the date of evaluation area.

In this embodiment, though the research item DB 151, the progress level DB 152, the advisory information DB 153, and the customer information DB 154 are included in the evaluation apparatus 100, the configuration of the databases is not limited to that. For example, the evaluation apparatus 100 may be connected to distributed databases via the network 10.

The program data storage 160 may comprise, for example, predetermined storage devices such as a hard disk drive (HDD) and a ROM (Read Only Memory), and stores various program data to be executed by the control unit 110. The program data storage 160 stores Operating System (OS) as a fundamental program for the evaluation apparatus 100, and other additional computer programs for realizing the significant operations or processing according to the present invention. Processing described later will be realized by execution of those programs. In this case, the control unit 110 collaborates with other components of the evaluation apparatus 100 (CCU 120, input controller 130, output controller 140, and DB unit 150) to realize the processing.

Figure 8:
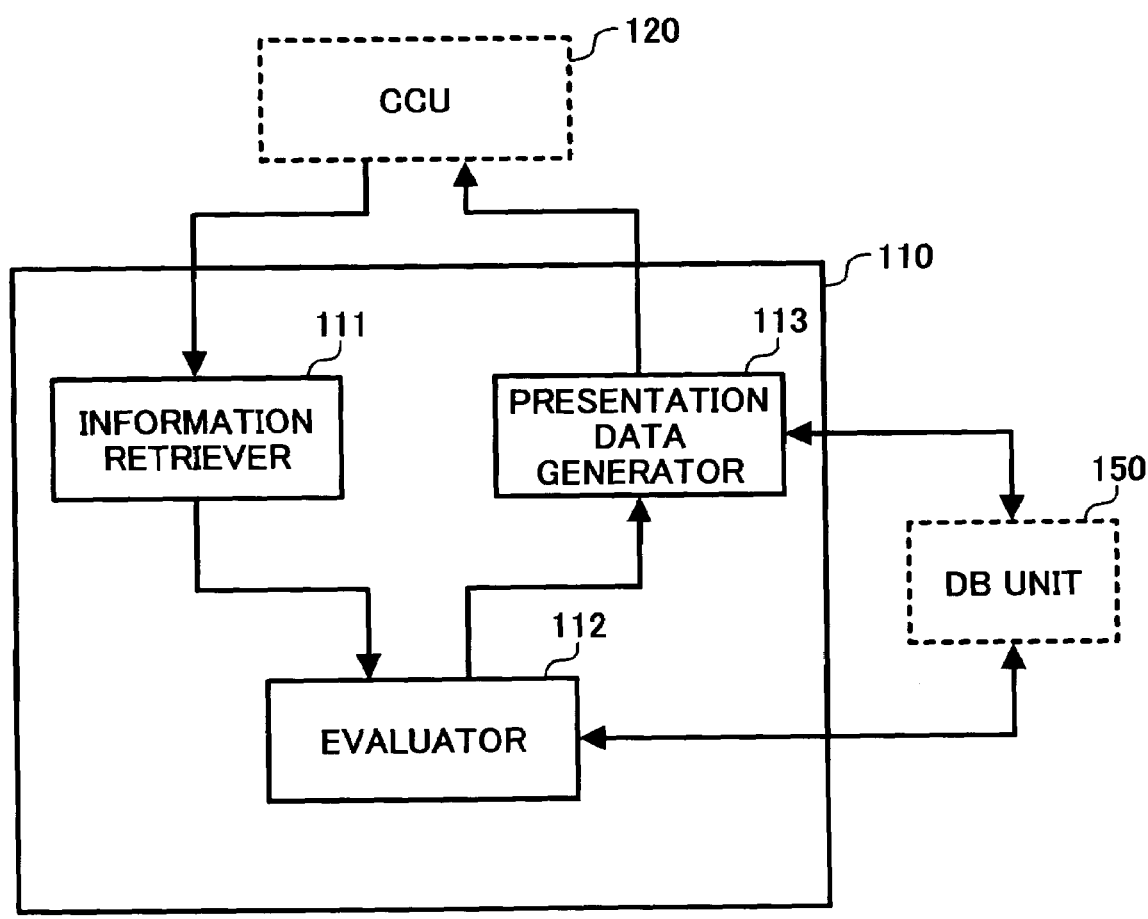
FIG. 8 is a functional block diagram showing functions of the control unit shown in FIG. 2.

More precisely, execution of the programs causes the control unit 110 to act as functions shown in FIG. 8. As shown in FIG. 8, the control unit 110 of the evaluation apparatus 100 according to this embodiment will act as an information retriever 111, an evaluator 112, and a presentation data generator 113.

The information retriever 111 collaborates with the CCU 120 to retrieve information from the user terminal 200 via the network 10. In this embodiment, the information retriever 111 obtains information representing the environmental measures being carried out by the customer (hereinafter, referred to as "status information") from the user terminal 200.

In this embodiment, the information retriever 111 will send "research sheet" for researching the environmental measures being carried out by the customer to the user terminal 200, and obtain answers to the questions in the research sheet as the status information. Therefore, the information retriever 111 collaborates with the presentation data generator 113 to generate data representing the research sheet, and sends the generated research sheet data to the user terminal 200 for status information retrieval.

In this case, the research sheet may be prepared, for example, as web page format. In this embodiment, the evaluation apparatus 100 also acts as a web server, and communicates with the user terminal 200 via the web pages.

The evaluator 112 collaborates with the DB unit 150 to evaluate the environmental measures by the customer who applied the status information, based on the status information obtained by the information retriever 111 and the data stored in the DB unit 150.

The evaluator 112 also obtains advisory information or sample case information from the DB unit 150 in accordance with the evaluation result.

The presentation data generator 113 generates web page data and the like to be sent to the user terminal 200 in response to the instructions from the information retriever 111 or the evaluator 112. The presentation data generator 113 collaborates with the CCU 120 to send the generated data to the user terminal 200.

The user terminal 200 will now be described. The user terminal 200 may comprise, for example, a computer apparatus such as a personal computer (PC). The user terminal 200 may be handled by the customer of the environmental measures evaluation service according to this embodiment. The user terminal 200 basically comprises a predetermined I/O devices (for example, a keyboard, a pointing device, a display, and the like), a predetermined processing unit (for example, a CPU, and the like), and a predetermined storage devices (for example, RAM, HDD, and the like). Additionally, the user terminal 200 also comprises predetermined telecommunications devices (for example, NIC, modem, TA (Terminal Adaptor, and the like) for communicating with the evaluation apparatus 100 via the network 10.

In this embodiment, for example, a person in charge of environmental activities operates the user terminal 200 being connected to the evaluation apparatus 100 to input data representing the environmental measures being carried out. Accordingly, the user terminal 200 is used for inputting data regarding the customer concerned, or for outputting resultant data or advisory information. More precisely, the display of the user terminal 200 displays the research sheet or the progress indicator showing evaluation result or advisory information. The keyboard or the pointing device is used for selecting answers for the research sheet or inputting commands for sending data or printing.

Figure 9:
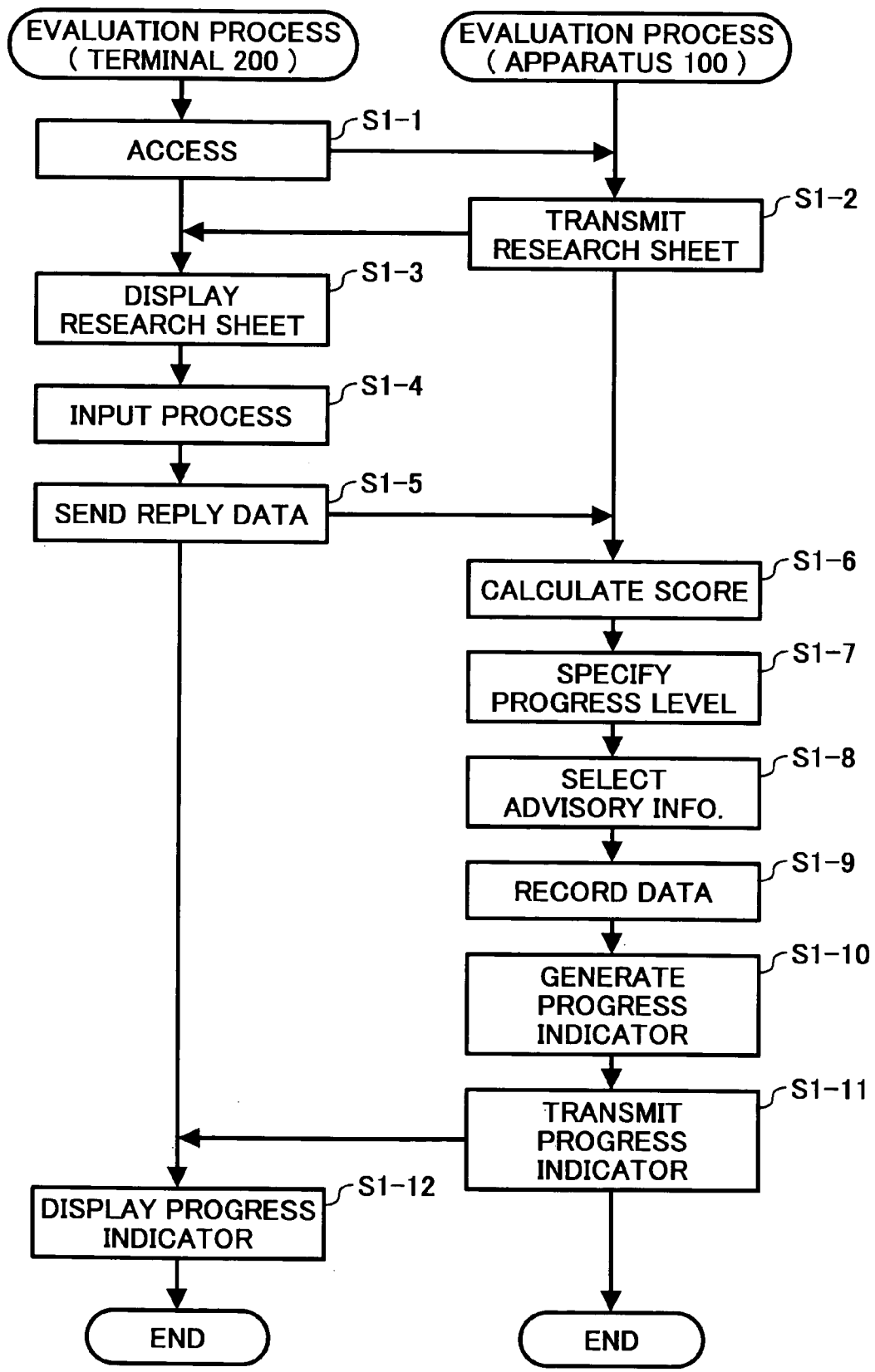
FIG. 9 is a flowchart for explaining an "Evaluation Process" according to the embodiment of the present invention.

Operations of thus structured evaluation system 1 will now be described with reference to the drawings. "Evaluation Process" carried out by the evaluation apparatus 100 and the user terminal 200 will now be described with reference to a flowchart shown in FIG. 9.

First of all, the user terminal 200 accesses the evaluation apparatus 100 (step S1-1). In this case, the user terminal 200 sends request command for accessing the web site provided by the evaluation apparatus 100 to the evaluation apparatus 100 via the network 10.

Once the CCU 120 of the evaluation apparatus 100 receives the access request from the user terminal 200, the information retriever 111 collaborates with the presentation data generator 113 to generate the research sheet. More precisely, the information retriever 111 obtains the research item data D51 from the research item DB 151, and generates the research sheet including the research items represented by the research item data D51.

Then, the presentation data generator 113 collaborates with the CCU 120 to send the generated research sheet data to the user terminal 200 via the network 10 (step S1-2).

Once the user terminal 200 receives the research sheet data from the evaluation apparatus 100 via the network 10, the user terminal 200 displays the research sheet image 500 as shown in FIG. 10 based on the received data (step S1-3).

As shown in FIG. 10, the research sheet image 500 shows contents (questions) for research category by category. Besides each item, a pair of radio buttons for choosing the answer Yes or No are arranged. Additionally, the research sheet image 500 also includes user name input box 505 and a send button 506.

The user terminal 200 displaying the research sheet image 500 performs input processing via the research sheet (step S1-4). A customer person (user) operates the input devices of the user terminal 200 to input necessary information. More precisely, the user inputs the user name in the user name input box 505 and selects radio buttons at each item. If the contents of the question correspond to the user's activity, the user should choose a radio button representing "Yes". On the contrary, if the contents of the question do not correspond to the user's activity, the user should choose another radio button representing "No".

After all sets of the radio buttons are chosen and the send button 506 is operated, the user terminal 200 sends the input information (hereinafter, referred to as "reply data") to the evaluation apparatus 100 via the network 10 (step 1-5).

The reply data may include the category code for specifying the category of the research items, contents code, and answer data representing Yes or No. Together with the reply data, the user terminal 200 also sends customer data (representing, for example, user name, or the like) for specifying the customer concerned, and the like.

When the CCU 120 of the evaluation apparatus 100 receives the reply data and the customer data, the information retriever 111 obtains the data as the status data.

Then, the evaluator 112 starts to calculate score based on the status data obtained by the information retriever 111 (step S1-6). The score represents the level of the environmental measures of the customer concerned.

The evaluator 112 refers to the reply data and specifies items to which "Yes" is given as the answer. Then the evaluator 112 accesses the research item DB 151 to retrieve reference scores of the specified items. Further, the evaluator 112 adds up the reference scores category by category, and calculates the total score as the user's score.

The evaluator 112 determines the progress level of the customer concerned based on the calculated score (step 1-7). The evaluator 112 refers to the progress level table D52 in the progress level DB 152 to determine the progress level corresponding to the calculated score.

Then the evaluator 112 selects the appropriate advisory information (step S1-8). More precisely, the evaluator 112 accesses the advisory information DB 153 to retrieve the advisory information corresponding to the progress level.

After the advisory information retrieval is completed, the evaluator 112 accesses the customer information DB 154 to record the customer data of the evaluated customer (step S1-9). The evaluator 112 creates a new record corresponding to the user name of the customer concerned based on the given customer data, and enters the data representing the score, progress level, and present date and time into the record.

Then, the evaluator 112 collaborates with the presentation data generator 113 to generate a progress indicator based on the user score or the progress level (step S1-10). For example, the evaluator 112 may generate a radar chart based on the score calculated category by category.

The evaluator 112 may calculate additional index. In this embodiment, the evaluator 112 may add up scores for "air conditioning", "lighting", and "office automation equipment" categories, and results as an additional index of "Energy Saving" (energy saving index (ESI)). And the evaluator 112 may add up scores for "Green Procurement", "water usage", "fuel consumption (gasoline)", and "zero waste" categories, and results as another additional index of "Resource Saving" (resource saving index (RSI)).

The evaluator 112 also generates portfolio based on the additional indexes. A vertical axis of the portfolio may represent the energy saving index (ESI), while a horizontal axis thereof may represent the resource saving index (RSI).

The presentation data generator 113 collaborates with the CCU 120 to transmit data representing the generated progress indicator (hereinafter, referred to as "result data") to the user terminal 200 via the network 10 (step S1-11), then the processing terminates. At this step, the evaluation apparatus 100 transmits web page data including the calculated scores and progress level, advisory information, radar chart, portfolio, research contents, answers, reference scores, and the like.

Figure 11B:
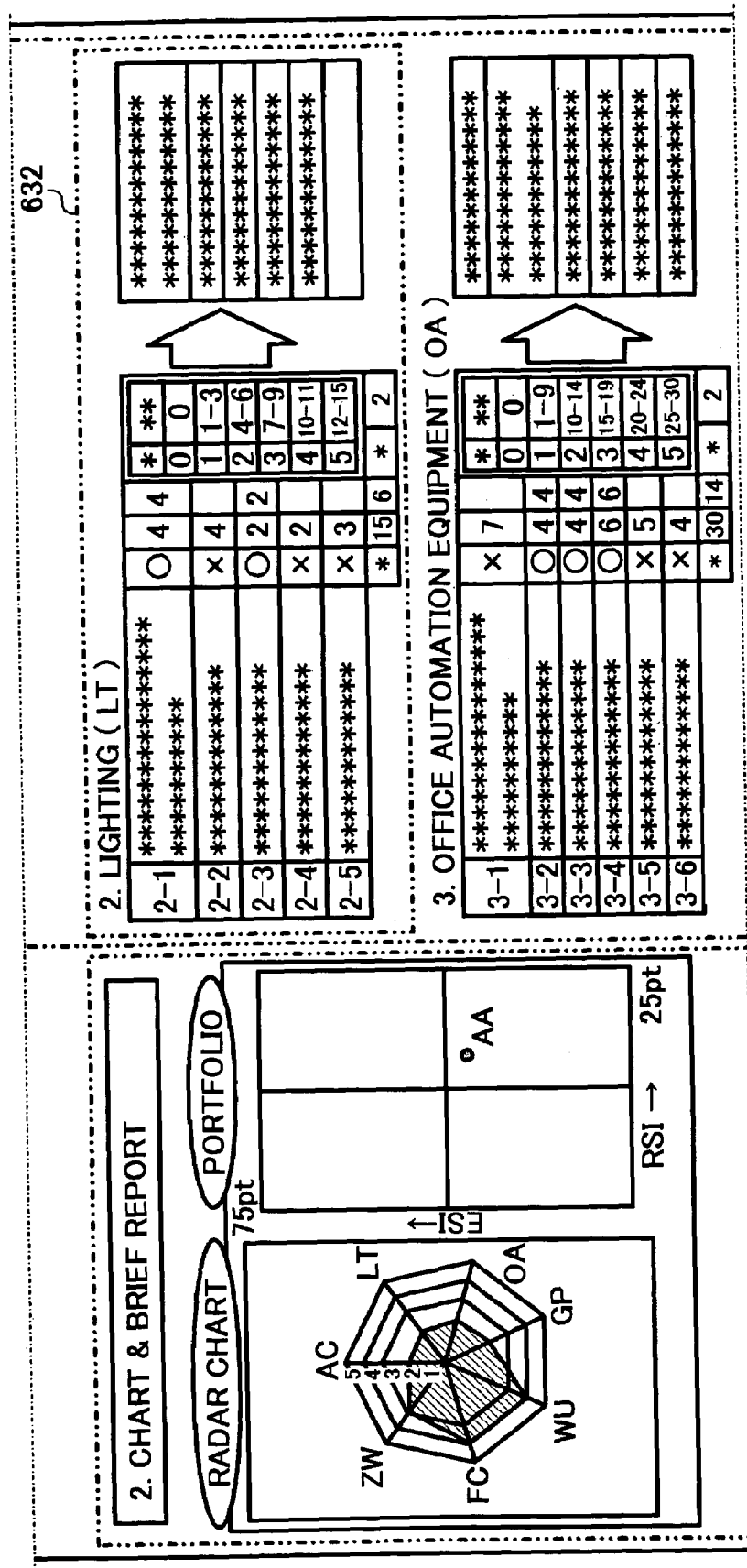
FIG. 11 is a diagram exemplifying a "Progress Indicator" displayed through the Evaluation Process shown in FIG. 9.
Figure 11D:
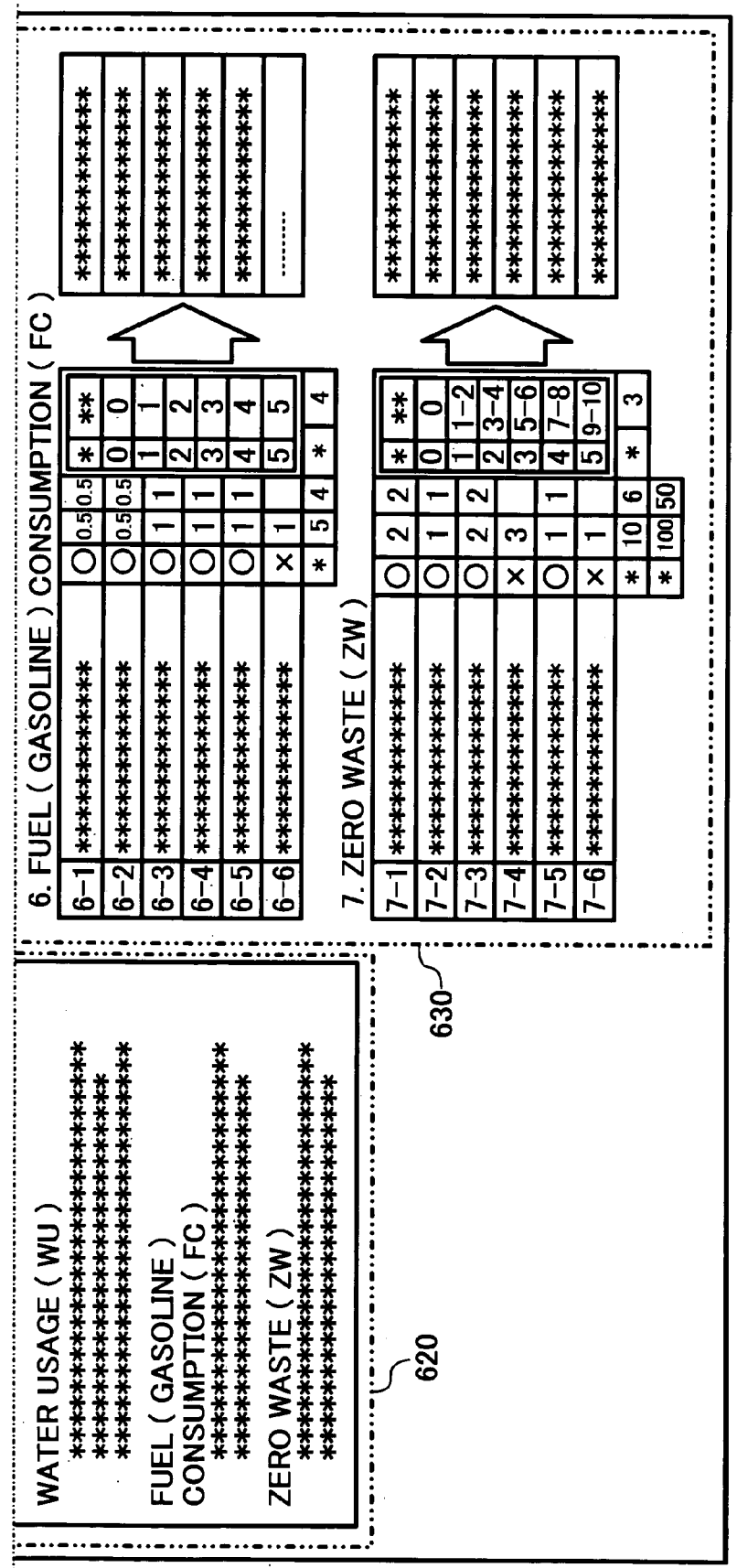

The user terminal 200 receives the result data, and displays the progress indicator image 600 as shown in FIG. 11 on the display (step S1-12), then the processing terminates.

As shown in FIG. 11, the progress indicator image 600 has some sections such as an evaluation result section 610, a chart and brief report section 620, and a detailed advice section 630.

Figure 12:
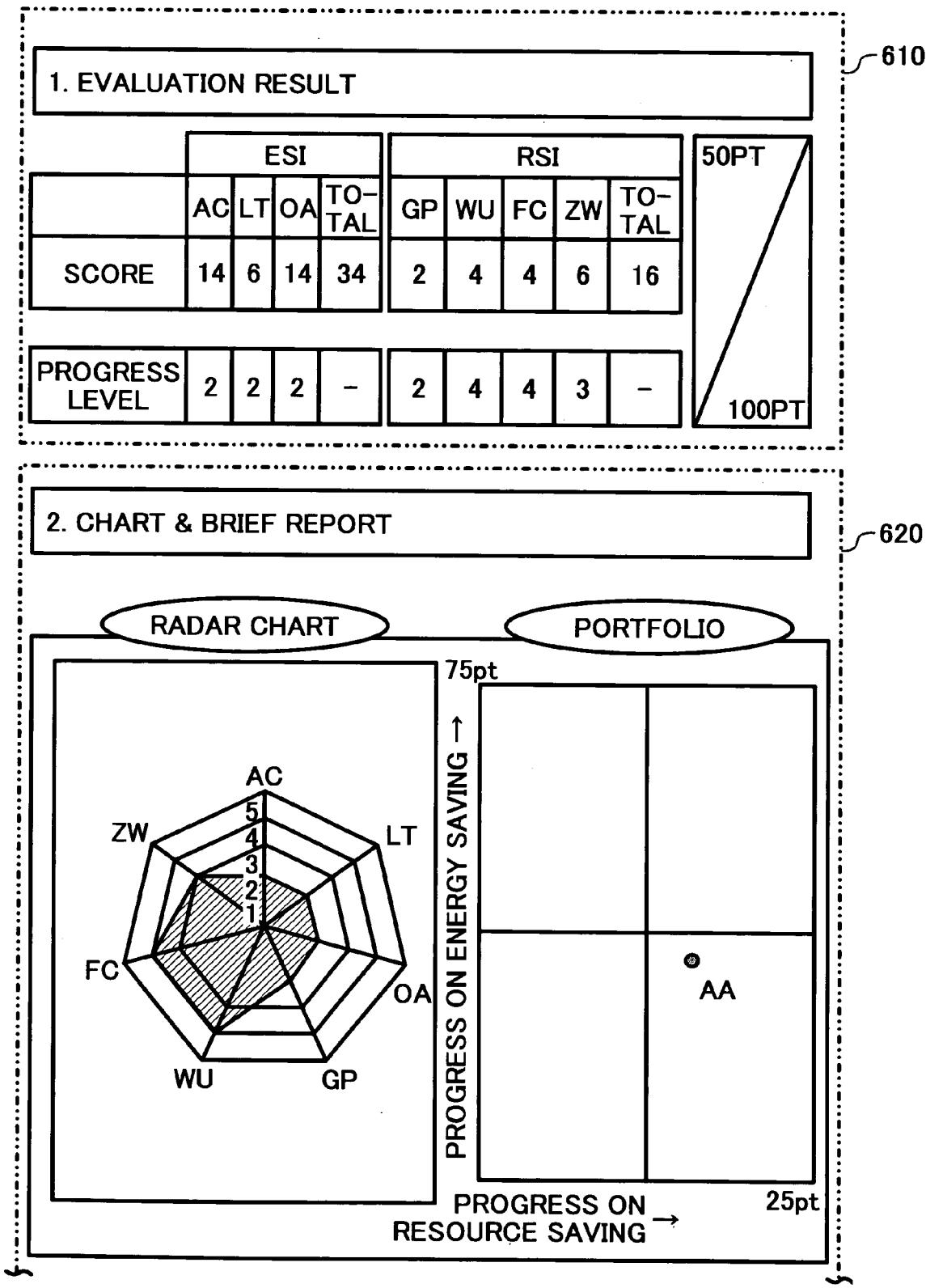
FIG. 12 is a diagram exemplifying an "Evaluation Result" section in the progress indicator shown in FIG. 11.

In the evaluation result section 610, the scores and progress level are displayed category by category as shown in FIG. 12.

In the chart and brief report section 620, visualized progress level indicator and advisory information for improvement are displayed as shown in FIG. 12. The progress level indicator includes, for example, radar chart, portfolio, and the like. The radar chart is helpful for understanding the balance of the achievement. The portfolio is helpful for finding rooms for achievements regarding energy saving and resource saving.

Figures 13A, 13B:
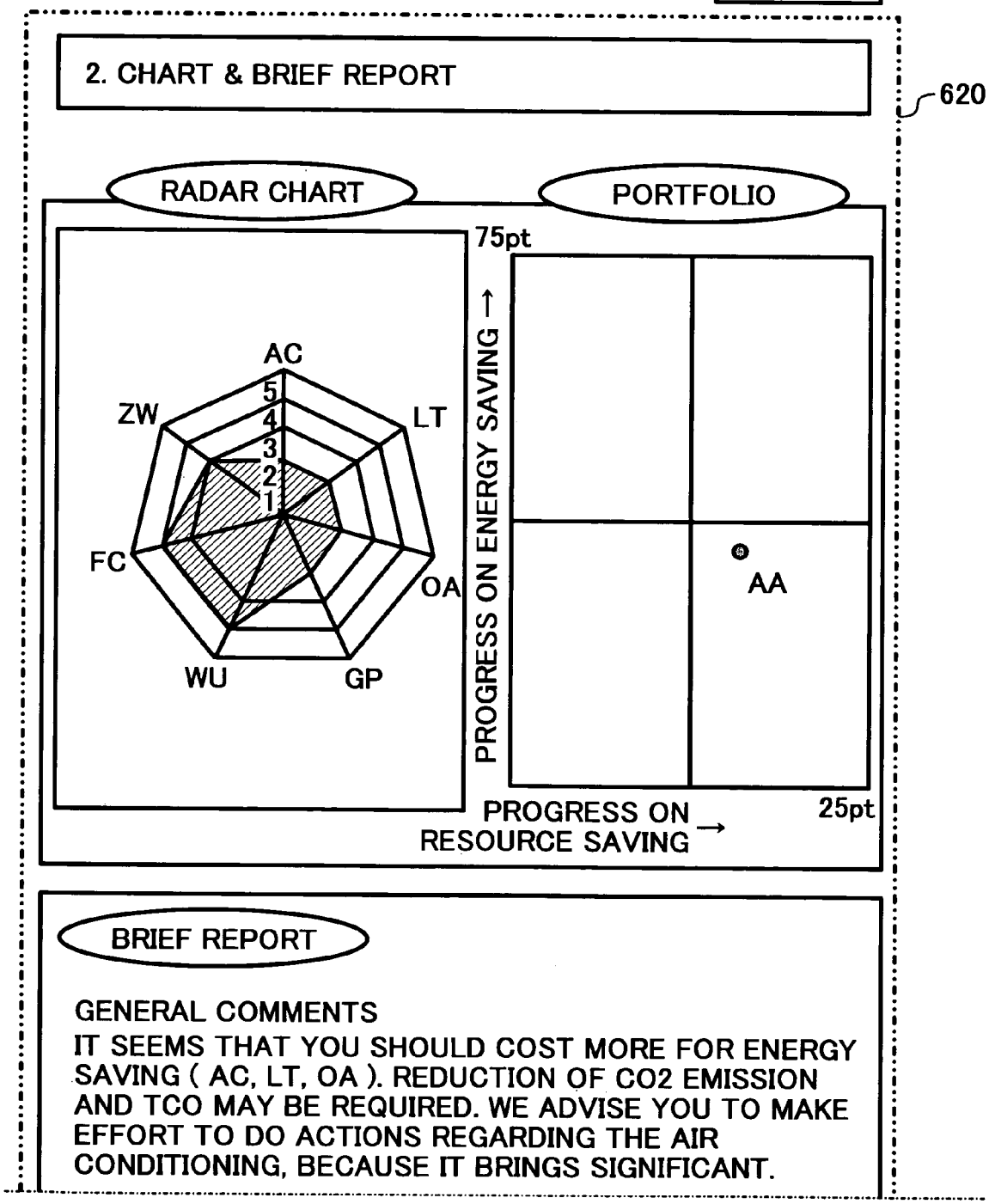
FIG. 13 is a diagram exemplifying a "Chart and Brief Report" section in the progress indicator shown in FIG. 11.

In the detailed advice section 630, information representing details of advices or proposals for the customer concerned is displayed as shown in FIG. 13. More precisely, the information shown in the detailed advice section 630 includes the research item contents, answers, reference scores, calculated scores, and progress levels, and those are displayed category by category.

Figure 14B:
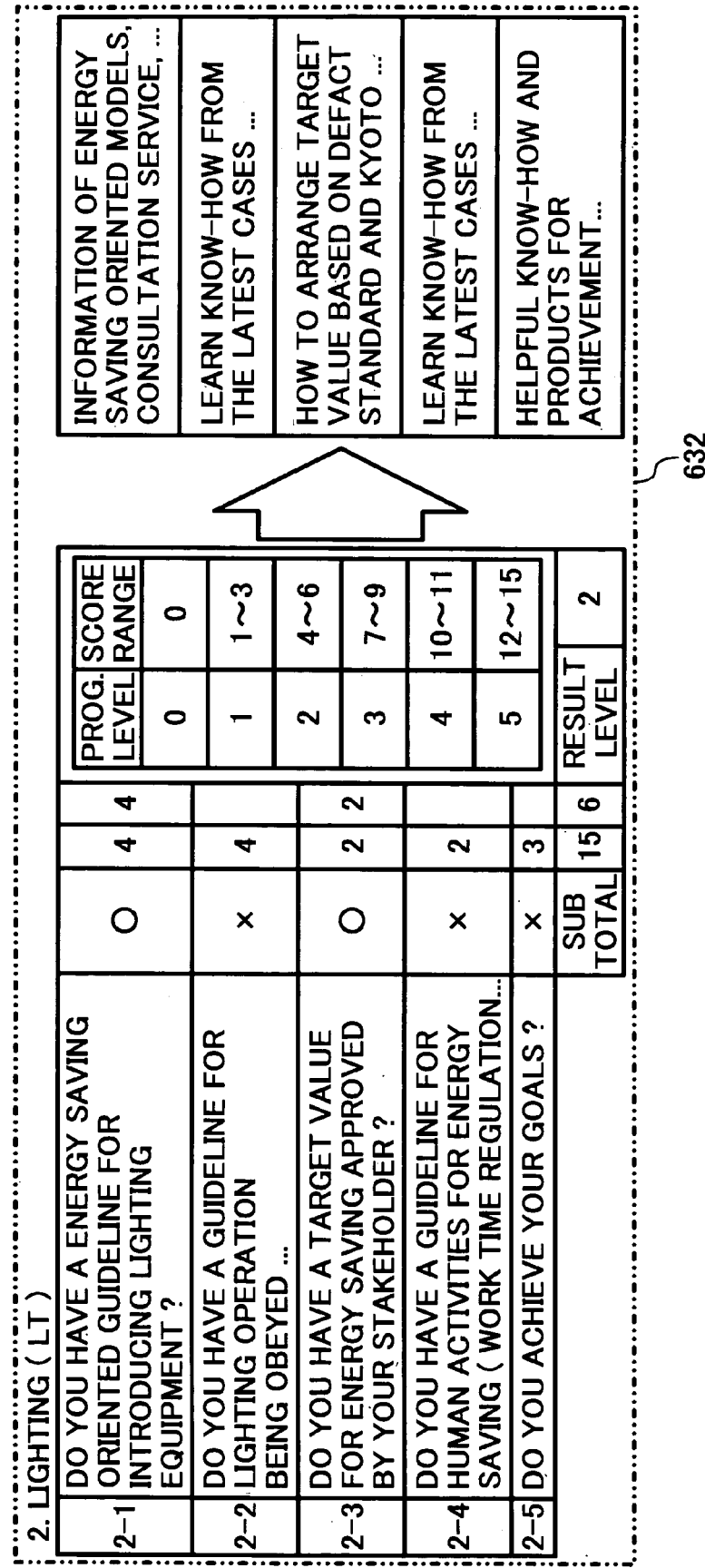
FIG. 14 is a diagram exemplifying a "Detailed Advisory Information" section in the progress indicator shown in FIG. 11.

FIG. 14 is an enlarged diagram of FIG. 13 for showing a category part 631 corresponding to "air conditioning" category and another category part 632 corresponding to "lighting" category in the detailed advice section 630. As shown in FIG. 14, the detailed advice section 630 shows unachieved items, and sample cases helpful for achieving those items.

As described above, the evaluation system 1 according to the embodiment of the present invention realizes presentation for reducing the environmental impacts.

That is, the evaluation apparatus 100 proposes measures for reducing the environmental impacts based on the actual activities being carried out by the customer. Thus, the customers are able to improve their environmental measures based on the proposals given by the evaluation apparatus 100. As a result, more effective environmental activities are realized.

Moreover, the evaluation apparatus 100 evaluates category by category with 6-graded evaluation to determine progress level of each category, and shows the progress level by the radar chart or the portfolio. Such the detailed and objective evaluation is helpful for the customer to promote well-balanced environmental measures. Especially, according to the graphical radar chart, the user can understand unachieved fields.

Furthermore, the reference score for determining the progress level may be arranged based on expectable results in the environmental conservation. In the above embodiment, the expectable amount of carbon dioxide ($CO_2$) reduction caused by the environmental action, is used as the base for arranging the reference scores. Since the $CO_2$ emission is known as major environmental impact, the amount of expectable decrease of carbon dioxide ($CO_2$) is a common index parameter for evaluation. Thus, the evaluation system 1 realizes objective evaluation based on the activities being carried out by the customer, with using such the common parameter.

Though the evaluation apparatus 100 according to the above embodiment specifies the items whose answers are "Yes" to generate the progress indicator, the evaluation apparatus 100 may generate the progress indicator based on the items whose answers are "No". In this case, the result may reveal actions which have not been carried out by the customer concerned. This option may be selectable by the users to provide advisory information actually helpful for the user. The evaluation apparatus 100 may evaluate the environmental measures based on all items regardless of their answers.

Though the embodiment where the present invention is applied to the system and the apparatus has been described, the present invention may be realized as a method for evaluating the environmental measures with using a computer system.

Moreover, the present invention may be realized as a computer program product or a computer data signal. In this case, the computer program product may be recording media (for example, CD-ROM, MO disk, DVD, FD, flash memory, memory card, and the like) in which computer programs which cause the computer system as the above mentioned evaluation apparatus 100 are recorded. In spite of the above recording media, such the computer data signal representing the program may be embodied in carrier wave to distribute the computer program data through the telecommunications network (for example, the Internet).

Any general computer system can act as the evaluation apparatus 100 by executing such the computer program. The computer programs may be installed in the computer system by reading from the recording medium, or downloading via the telecommunications network.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

Though, in the above embodiment, the evaluation apparatus 100 collects data through the research sheet image 500 to evaluate the level of the environmental measures of the customers, the method of evaluating the level is not limited to that. For example, the evaluation apparatus 100 may accept user's free application of data representing environmental measures being carried out by the user, and perform the evaluation based on the data input by the user. More precisely, the evaluation apparatus 100 may have a storage for storing data representing information helpful for reducing the environmental impact and scores (points) being associated with each other. When the evaluation apparatus 100 receives data representing the user's activity for reducing the environmental impact from the user terminal 200 via the network 10, the evaluation apparatus 100 memorizes the received data. Then, the evaluation apparatus 100 extracts keywords from the data, and accesses the storage to search for the same or similar information based on the keywords. The evaluation apparatus 100 refers to the scores associated with the found information, and evaluates the user's level based on the scores. Finally, the evaluation apparatus 100 sends advisory information corresponding to the level to the user terminal 200 via the network 10.

Though, in the above embodiment, the reference scores are arranged based on the expectable decrease of $CO_2$ reduced by performing the action, the reference scores may be arranged arbitrary. That is, any indexes useful for evaluating the reduction of the environmental impact are applicable to arrange the reference scores. For example, the reference score may be arranged by TCO (Total Cost of Ownership), or the like.

In the above embodiment, the users' levels are evaluated category by category base on the total score after adding up the scores corresponding to the research items respectively. In spite of that, for example, each of the research items may be leveled previously. And the evaluation apparatus 100 may carry out the evaluation based on the highest or lowest level as the progress level of the category.

In spite of the radar chart or portfolio exemplified in the above embodiment, arbitrary graphical display may be applicable. For example, resultant levels may be shown by bar graph or the like.

Though, in the above embodiment, the user gains 100 pt as full score if all items are carried out, scoring arrangement may be arbitrary.

In the above embodiment, it exemplifies the case where evaluation of environmental measures is provided as service. Embodiment to which the present invention is applied for evaluating the environmental measures is not limited to that. For example, the system may be employed for in-house use in a business entity. In this case, the environmental measures may be evaluated site by site.

This application is based on Japanese Patent Application No. 2004-69328 filed on Mar. 11, 2004 and including specification, claims, drawings and summary. The disclosure of the above Japanese Patent Application is incorporated herein by reference in its entirety.

What is claimed is:

1. An evaluation apparatus for evaluating environmental measures being connected to a terminal via a network, comprising:
   a level data storage which stores data representing level corresponding to environmental measures;
   an advisory data storage which stores advisory information for improving the level;
   a customer information storage which records a user name of a user, a score calculated from information representing environmental measures carried out by the user and a progress level of the user;
   an information retriever which obtains information representing environmental measures carried out by a user from said terminal of the user via said network;
   an evaluation unit which calculates a score based on the information representing environmental measures carried out by the user, specifies a progress level of the user based on the score calculated from the information representing environmental measures carried out by the user and the data stored in said level data storage, and collaborates with a presentation display generator to generate a progress indicator based on the score or progress level; and
   an advisory information transmitter which obtains the advisory information from said advisory data storage based on the progress level specified by said evaluation unit and transmits as evaluation result data the progress indicator, the calculated score, the progress level and the obtained advisory information to said terminal via said network.

2. The evaluation apparatus according to claim 1, wherein, said level data storage further comprises:
   a score data storage which stores score data representing scores assigned to each environmental measures; and
   a decision data storage which stores decision data for deciding the level corresponding to the score, and
   said evaluation unit obtains score data corresponding to the data obtained from said terminal from said score data storage, and specifies level of said user by obtaining the decision data corresponding to the obtained score from said decision data storage.

3. The evaluation apparatus according to claim 1, wherein said level data storage stores information representing environmental measures with predetermined categorization,
   said evaluation unit specifies level of the user in accordance with said categorization, and
   said advisory information transmitter transmits said evaluation result data so as to present indication for comparing the level specified by said evaluation unit in accordance with the categorization.

4. The evaluation apparatus according to claim 1 further comprising a precedent data storage which stores precedent information regarding each of the environmental measures, and wherein
   said evaluation unit obtains precedent information corresponding to the evaluation result data from said precedent data storage, and
   said advisory information transmitter transmits said evaluation result data so as to present the precedent information obtained by said evaluation unit.

5. An evaluation apparatus being connected to a terminal via a network for evaluating environmental measures comprising:
   level data storage means for storing level data regarding levels corresponding to environmental measures including environmental measures data representing categorized environmental measures score data representing scores assigned to the environmental measures respectively, decision data for deciding the level corresponding to the score;
   precedent data storage means for storing precedent information corresponding to each of the environmental measures;
   advisory data storage means for storing advisory data for improving the level;
   information retrieving means for obtaining information representing environmental measures carried out by a user from a terminal of said user via said network;
   evaluation means for evaluating level of the user based on the information obtained by said information retriever and the data stored in said level data storage means; and
   advisory data transmission means for obtaining advisory information from said advisory data storage means and precedent information from said precedent data storage means based on the level specified by said evaluation means, and transmits evaluation result data including the obtained advisory information and precedent information to be graphically displayed, to said terminal via said network.

6. A method for evaluating environmental measures, comprising:
   recording level data regarding levels corresponding to environmental measures;
   recording advisory information for improving the levels;
   obtaining information representing environmental measures carried out by a user from a terminal of said user via a network;
   calculating a score based on the information representing environmental measures carried out by the user;
   specifying a progress level of said user based on the score calculated from the information representing environmental measures carried out by the user and said level data;
   obtaining advisory information corresponding to the specified progress level;
   recording the user name of the user, the score calculated from the information representing environmental measures carried out by the user and the progress level of the user;
   generating a progress indicator based on the score or progress level; and
   transmitting as evaluation result data the progress indicator, the calculated score, the progress level and the obtained advisory information to said terminal via said network.

7. The method according to claim 6 further comprising the steps of:
   recording score data representing scores assigned to the environmental measures respectively;
   recording decision data for deciding levels corresponding to scores;
   obtaining scored data corresponding to the data obtained from said terminal; and
   specifying the level of said user by obtaining the decision data corresponding to the obtained score.

8. The method according to claim 6 further comprising the steps of:

recording score data representing scores each arranged for the environmental measures respectively based on the amount of carbon dioxide decrease resulting from carrying out the environmental measures;

recording decision data for deciding the levels corresponding to score;

obtaining score data corresponding to the data obtained from said terminal; and specifying level of said user by obtaining decision data corresponding to the obtained score.

9. The method according to claim 6 further comprising the steps of:

storing data representing environmental measures with predetermined categorization;

storing data regarding level corresponding to the environmental measures;

specifying level of said user category by category; and transmitting said evaluation result data including data for graphically displaying the specified levels for comparison, to said terminal via said network.

10. The method according to claim 6 further comprising the steps of:

storing data representing precedent information corresponding to each of the environmental measures; and obtaining said precedent information, and transmitting said obtained precedent information together with said evaluation result data.

11. A machine-readable medium having program code stored thereon which, when executed by a machine, causes the machine to execute a method for evaluating environmental measures, the method comprising:

recording level data regarding levels corresponding to environmental measures;

recording advisory information for improving the levels;

obtaining information representing environmental measures carried out by a user from a terminal of said user via a network;

calculating a score based on the information representing environmental measures carried out by the user;

specifying a progress level of said user based on the score calculated from the information representing environmental measures carried out by the user and said level data;

obtaining advisory information corresponding to the specified progress level;

recording the user name of the user, the score calculated from the information representing environmental measures carried out by the user and the progress level of the user;

generating a progress indicator based on the score or progress level; and transmitting as evaluation result data the progress indicator, the calculated score, the progress level and the obtained advisory information to said terminal via said network.

* * * * *